United States Patent
Tyan et al.

(10) Patent No.: US 9,541,680 B2
(45) Date of Patent: Jan. 10, 2017

(54) MULTI-FUNCTION COMPOSITE OPTICAL FILM

(71) Applicant: UBRIGHT OPTRONICS CORPORATION, Taoyuan County (TW)

(72) Inventors: Yi-Long Tyan, Hsinchu (TW); Chi-Chen Liu, Taoyuan County (TW); Lung-Pin Hsin, Taoyuan County (TW); Hui-Yong Chen, New Taipei (TW)

(73) Assignee: UBright Optronics Corporation, Taoyuan County (TW)

( * ) Notice: Subject to any disclaimer, the term of this patent is extended or adjusted under 35 U.S.C. 154(b) by 361 days.

(21) Appl. No.: 14/269,481

(22) Filed: May 5, 2014

(65) Prior Publication Data

US 2014/0355250 A1   Dec. 4, 2014

(30) Foreign Application Priority Data

May 29, 2013   (TW) .............................. 102118879 A (51) Int. Cl.
*G02B 5/02* (2006.01)

(52) U.S. Cl.
CPC ........... *G02B 5/0231* (2013.01); *G02B 5/0226* (2013.01); *Y10T 428/2457* (2015.01)

(58) Field of Classification Search
CPC   G02B 5/0231; G02B 5/0226; Y10T 428/2457
USPC .................. 362/627, 628, 629, 97.1, 311.01, 330,362/331, 333, 339
See application file for complete search history.

(56) References Cited

U.S. PATENT DOCUMENTS

| | | | | |
|---|---|---|---|---|
| 5,779,337 A * | 7/1998 | Saito | .................... | G02B 6/0038 362/23.15 |
| 7,618,164 B2 * | 11/2009 | Wang | ................... | G02B 5/0221 359/831 |
| 7,891,856 B2 * | 2/2011 | Chuang | .................. | G02B 5/045 349/62 |
| 8,506,149 B2 * | 8/2013 | Kim | ....................... | G02B 5/045 362/330 |
| 8,657,472 B2 * | 2/2014 | Aronson | .................. | G02B 5/02 359/536 |
| 2008/0130279 A1 * | 6/2008 | Hsu | ...................... | G02B 5/0231 362/246 |

(Continued)

FOREIGN PATENT DOCUMENTS

WO   WO 2008/032692   *   3/2008

*Primary Examiner* — Laura Tso
(74) *Attorney, Agent, or Firm* — Min-Lee Teng; Litron Patent & Trademark Office (57) ABSTRACT

A composite optical film has the functions of brightness enhancement, self-diffusion and defect blocking. The film comprises: a structured substrate including a structured light incidence surface and a light emitting surface opposite to the structured light incidence surface, wherein the structured light incidence surface includes longitudinal prism structures or longitudinal lens structures transversely arranged in rows; a support base plate adjacent to the light emitting surface of the structured substrate, the support base plate having a light incidence surface on one side and a light emitting surface on another side opposite to the light incidence surface, wherein at least one of the light incidence surface and the light emitting surface has a plurality of buried particles, and at least one portion of the buried particles are protruded on the light emitting surface of the support base plate.

20 Claims, 11 Drawing Sheets

(56) References Cited

U.S. PATENT DOCUMENTS

| | | | |
|---|---|---|---|
| 2009/0027897 A1* | 1/2009 | Chang | G02B 5/045 |
| | | | 362/330 |
| 2009/0040421 A1* | 2/2009 | Chang | G02B 5/0242 |
| | | | 349/62 |
| 2009/0154157 A1* | 6/2009 | Sah | G02B 5/0231 |
| | | | 362/235 |
| 2015/0070903 A1* | 3/2015 | Min | G02B 5/0268 |
| | | | 362/311.06 |

* cited by examiner

MULTI-FUNCTION COMPOSITE OPTICAL FILM

CROSS-REFERENCE TO RELATED APPLICATION

This application claims priority from Taiwan Patent Application No. 102118879 filed on May 29, 2013, which is hereby incorporated herein by reference in its entirety.

BACKGROUND OF THE INVENTION

1. Field of the Invention

The invention relates to a composite optical film including a structuralized substrate, and in particular, to an optical film capable of enhancing brightness, automatically diffusing light and blocking defects, and further in particular, to a composite optical film applicable to a flat panel display.

2. Description of Related Art

Flat panel displays are widely used for television displays, computer displays, and the displays of hand-held electronic apparatuses (e.g. mobile phones, mobile internet devices (MID) and so on). Liquid crystal displays (LCDs) pertain to a kind of the flat panel displays. LCDs display images by using a liquid crystal module having a pixel array.

Figure 1:
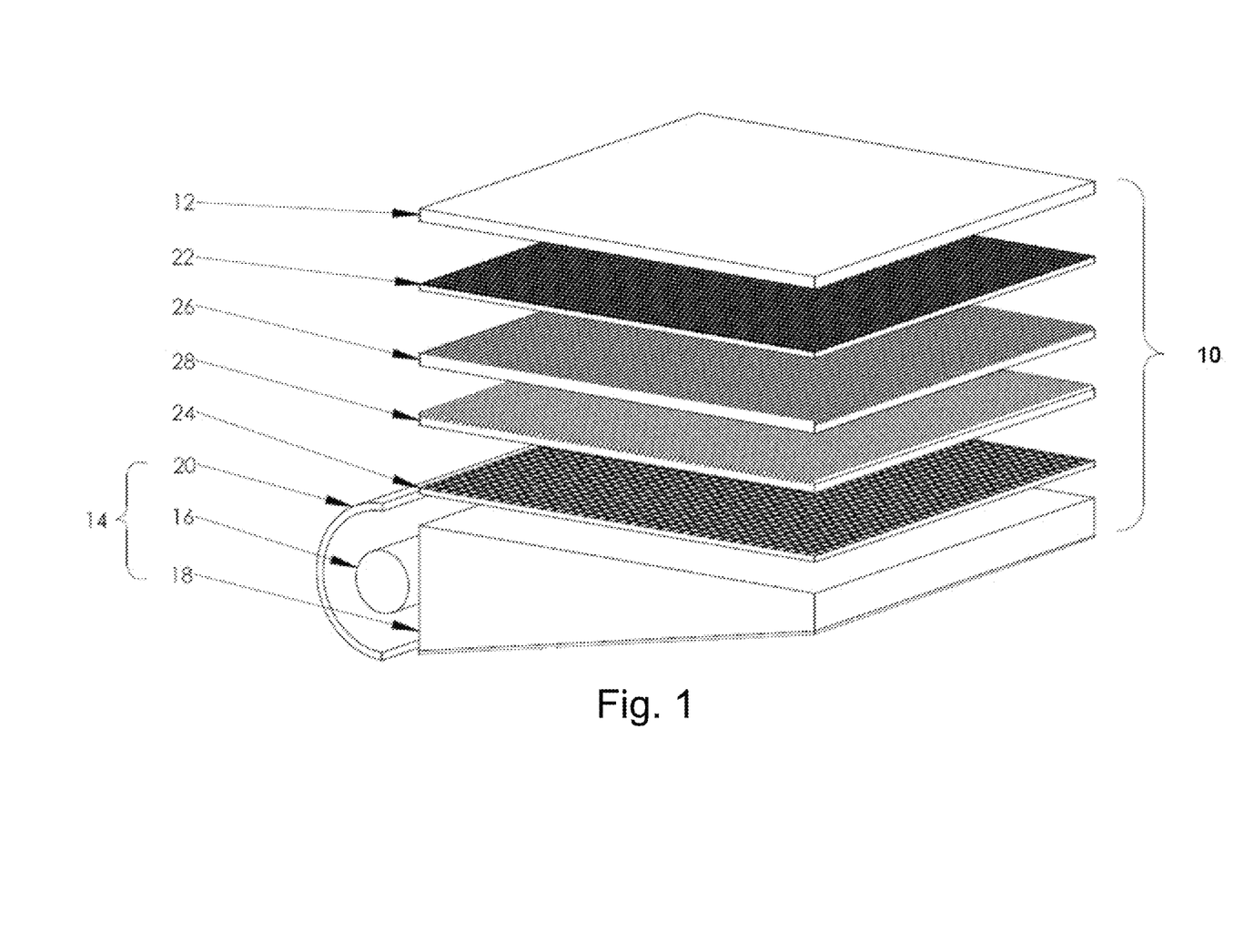
FIG. 1 schematically illustrates the structure of a prior art LCD.

FIG. 1 illustrates a conventional LCD. A backlight LCD 10 comprises a liquid crystal display module 12 and a backlight module 14 forming a plane light source. The backlight LCD 10 further comprises several optical films such as an upper light diffusion sheet 22, a lower light diffusion sheet 24 and brightness enactment sheets (26, 28) interposing between the liquid crystal display module 12 and the backlight module 14. The liquid crystal display 12 comprises liquid crystals sandwiched between two transparent substrates and a control circuit for defining a two-dimensional pixel array. The backlight module 14 has a plane light distribution and serves as a backlight directing light on a plane. As shown in FIG. 1, an edge-type backlight has a linear light source 16 disposed along an edge of a light guide plate 18. A reflecting sheet 20 is used to direct light from the linear light source 16 into the light guide plate 18 so that the light passes the uppermost surface of the liquid crystal display module 12. The optical films of the upper diffusion sheet 22, the lower diffusion sheet 24 and the brightness enactment sheets (26, 28) can redistribute or concentrate the through light. Thus, the light leaving from the optical films can be directed so that it goes towards a direction quite close to the normal line of the surface of the liquid crystal display module 12. The light is evenly distributed on the plane surface of the liquid crystal display module 12 and has a relatively high intensity along the normal line direction.

Power saving, less thickness and lightness is increasingly in demand for the liquid crystal display under constant quality. Therefore, the power dissipation, weight and thickness of the backlight module would be expectably reduced, and the thicknesses of the optical films therein would be also accordingly reduced. Most conventional liquid crystal displays have used two brightness enhancement sheets (as shown in the LCD of FIG. 1). Two brightness enhancement sheets are arranged by rotating them around the normal lines of the film planes so that the longitudinal directions of grooves on the two films are perpendicular to each other. Therefore, the light through the two films would be concentrated along the direction perpendicular to their light output surfaces. When optical turbulence occur in one of the flat surfaces or structuralized surfaces of the two brightness enhancement sheets, a displayed image consequently has undesired visual effects such as interference fringes (i.e. patterns having interlaced bright and dark stripes). The undesired visual effects resulting from the interference fringes, physical defects, spots and unequal distribution can be masked by an upper diffusion sheet 22 (e.g. the upper light diffusion sheet 22 above the brightness enhancement sheet 26).

Up to now, in order to reduce the entire thickness of all optical films in a liquid crystal display, a lot of technologies have focused on reducing the number of optical films used therein. For example, four optical films (FIG. 1 illustrating the optical films 22, 24, 26 and 28) are reduced to three optical films. For a common case, the upper light diffusion sheet 22 and the brightness enhancement sheet 26 are integrated into a single composite optical film, and the single composite optical film is further combined with the lower light diffusion sheet 24 and the brightness enhancement sheet 28 into a three-sheet structure. A liquid crystal display using such a three-sheet structure is widely employed in hand-held electronic apparatuses and laptop computers.

Further, in order to reduce the dimension and the cost of such products, the display manufacturers still need a liquid crystal display with a lighter and cost-effective optical structure superior to one with a three-sheet structure. Such an optical structure is capable of enhancing brightness, automatically diffusing light and masking defects.

SUMMARY OF THE INVENTION

The present application provides a composite optical film has the functions of brightness enhancement, self-diffusion and defect masking. The film comprises: a structured substrate including a structured light incidence surface and a light emitting surface opposite to the structured light incidence surface, wherein the structured light incidence surface includes longitudinal prism structures or longitudinal lens structures transversely arranged in rows; a support base plate adjacent to the light emitting surface of the structured substrate, the support base plate having a light incidence surface on one side and a light emitting surface on another side opposite to the light incidence surface, wherein at least one of the light incidence surface and the light emitting surface has a plurality of buried particles, and at least one portion of the buried particles are protruded on the light emitting surface of the support base plate. In one embodiment of the present invention, the longitudinal prism structures or the longitudinal lens structures are transversely arranged in row, wherein the crests of the prism structures or the lens structures in adjacent rows are substantially parallel to each other and distances between the adjacent crests are constant.

In one embodiment of the present invention, the heights of the crests of the prism structures or the lens structures are constant.

In one embodiment of the present invention, the heights of the crests of the prism structures or the lens structures vary along a longitudinal direction.

In a further embodiment of the present invention, the haze of the film is adjustable by varying the number of particles buried in at least one of the light incidence surface and the light emitting surface of the support base plate and the number of particles protruded on the light emitting surface of the support base plate.

In another embodiment of the present invention, the surface roughness, scratch-resistance and transmittance of the film are adjustable by varying the number of particles protruded on the light emitting surface of the support base plate.

In another embodiment of the present invention, the prism structures or the lens structures are formed using an UV resin material so that the structured substrate is capable of scratch-resistance and self-healing.

BRIEF DESCRIPTION OF THE DRAWINGS

In order to sufficiently understand the essence, advantages and the preferred embodiments of the present invention, the following detailed description will be more clearly understood by referring to the accompanying drawings.

DETAILED DESCRIPTION OF THE INVENTION

The following description shows the preferred embodiments of the present invention. The present invention is described below by referring to the embodiments and the figures. Thus, the present invention is not intended to be limited to the embodiments shown but is to be accorded the principles disclosed herein. Furthermore, that various modifications or changes in light thereof will be suggested to persons skilled in the art and are to be included within the spirit and purview of this application and scope of the appended claims.

The drawings show a whole configuration of each embodiment in a simple and clear manner. Well known features may not have been described in detail to avoid unnecessarily obscuring the invention. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The invention relates to a composite optical film capable of enhancing brightness, automatically diffusing light and masking defects. The composite optical film of the present invention is in the form of a film, sheet, plate, and the like, which may be flexible or rigid. The composite optical film of the present invention has a structured light incidence surface including longitudinal prism structures or longitudinal lens structures transversely arranged in rows. The inventive optical film may be adopted in display devices having display panels that may be flat or curved, and rigid or flexible.

The present invention will be further described below in connection with the illustrated embodiments.

Figure 2:
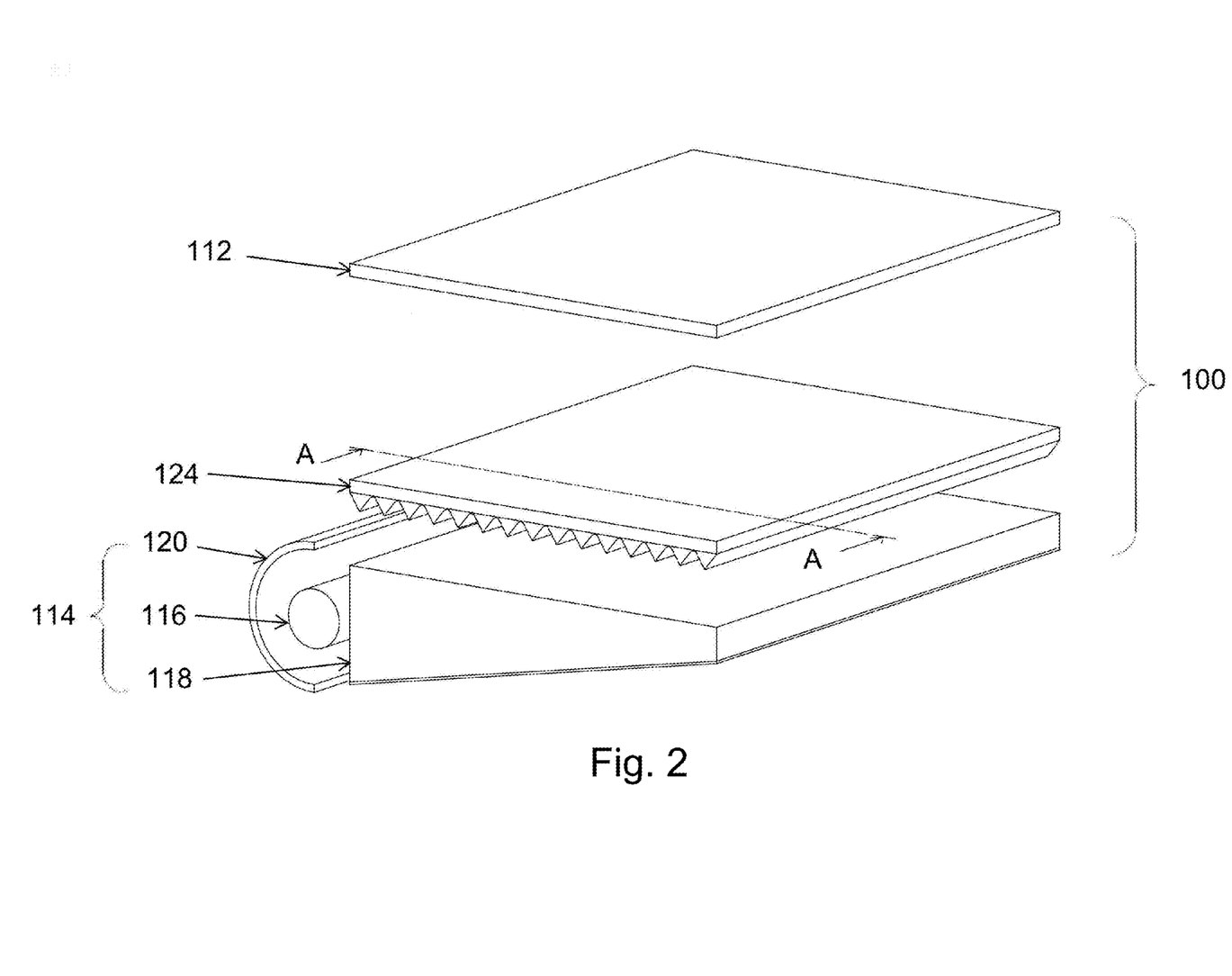
FIG. 2 is a schematic perspective view of a composite optical film having a structured light incidence surface, in accordance with one embodiment of the present invention.

FIG. 2 schematically illustrates an example of a flat panel display. A backlight LCD 100, in accordance with one embodiment of the present invention, comprises a liquid crystal (LC) display module 112, a planar light source in the form of a backlight module 114 and a composite optical film 124 interposed between the LC module 112 and the backlight module 114. The LC module 112 comprises liquid crystals sandwiched between two transparent substrates and a control circuit defining a two-dimensional array of pixels. The backlight module 114 provides planar light distribution. The backlight module 114 is either of the backlit type (i.e. the light source extends over a plane) or of the edge-lit type as shown in FIG. 2 (i.e. a linear light source 116 is provided at an edge of a light guide plate 118). A reflector 120 is provided to direct light from the linear light source 116 through the edge of the light guide 118 into the light guide 118. The light guide plate 118 is structured (e.g., with a tapered or flat plate having light reflective and/or scattering surfaces defined on the bottom surface facing away from the LC module 112) to distribute and direct light through the top planar surface facing towards LC module 112.

Figure 3A:
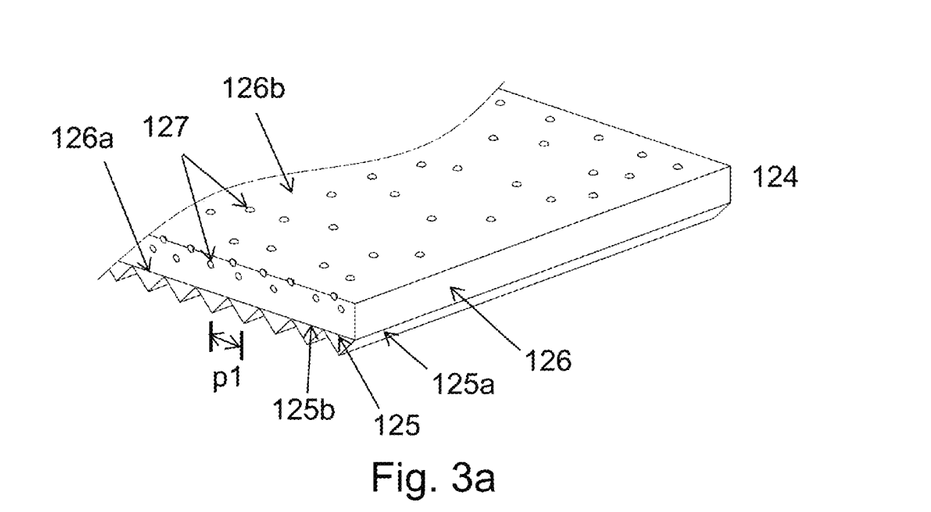
FIG. 3a is a schematic perspective view of a composite optical film having longitudinal prism structures transversely arranged in rows, in accordance with one embodiment of the present invention.
Figure 3B:
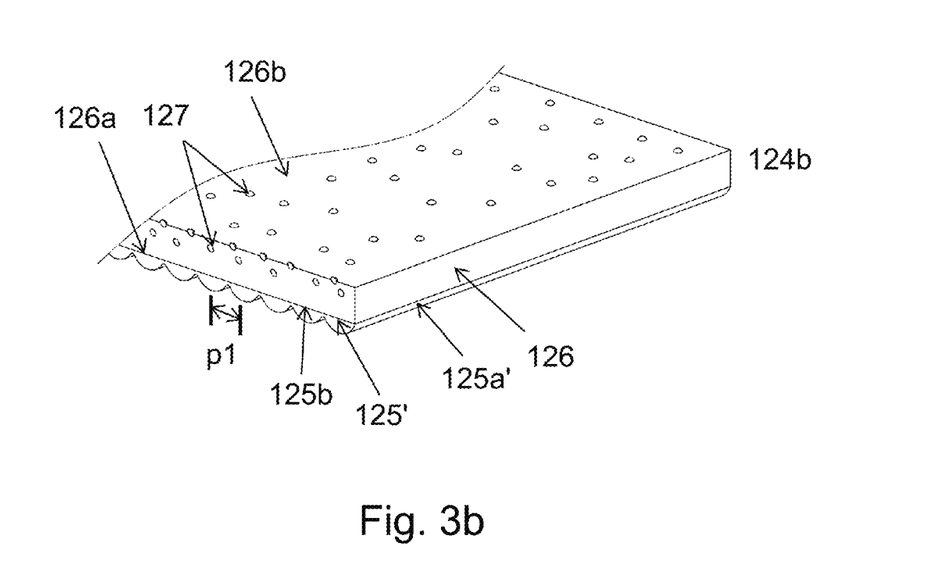
FIG. 3b is a schematic perspective view of a composite optical film having longitudinal lens structures transversely arranged in rows, in accordance with one embodiment of the present invention.
Figure 3C:
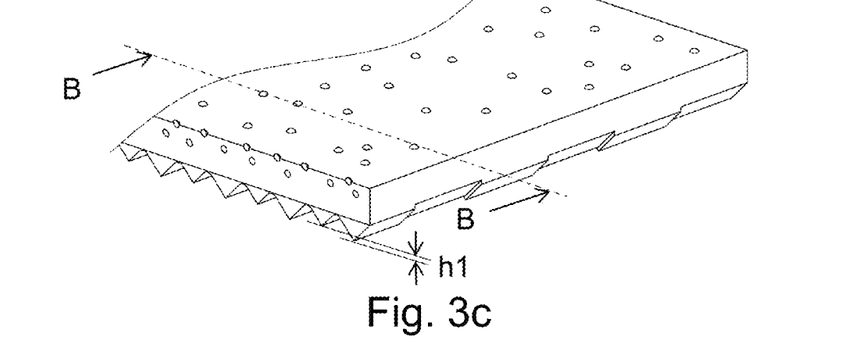
FIG. 3c is a schematic perspective view of a composite optical film having longitudinal prism structures with varied height transversely arranged in rows, in accordance with one embodiment of the present invention.
Figure 6:
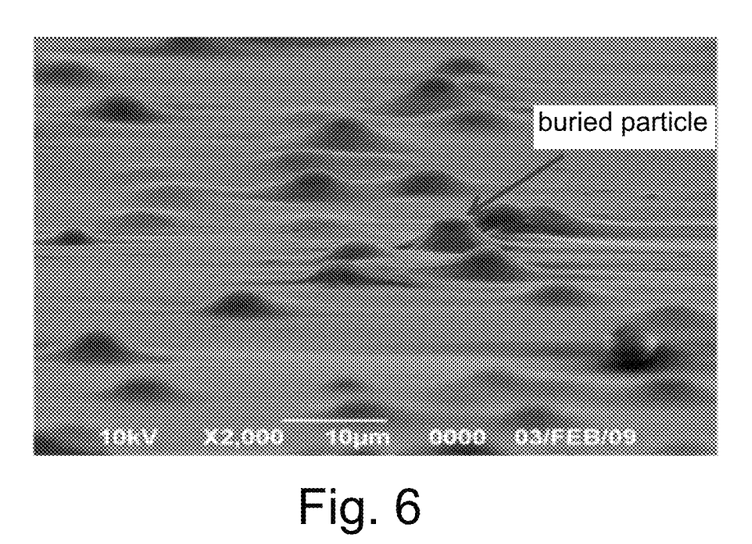
FIG. 6 is an SEM photograph of a light emitting surface with a plurality of buried particles.

FIG. 3a is a schematic and perspective cross-sectional view of the composite optical film 124 taken along an A-A line in FIG. 2. FIGS. 3b and 3c are schematic and perspective cross-sectional views of composite optical films 124b and 124c. They respectively represent three embodiments of the composite optical films. However, the present invention is not limited to the ratio of dimensions as illustrated in the embodiments and the arrangement and combination ways of the microstructures. As shown in FIG. 3a, a composite optical film 124 comprises a structured substrate 125 and a support base plate 126. The structured substrate 125 includes a structured light incidence surface 125a and a light emitting surface 125b opposite to the structured light incidence surface 125a. The structured light incidence surface 125a includes longitudinal prism structures (as shown in FIG. 3a) or longitudinal lens structures (as shown in FIG. 3b; the structured light incidence surface 125a' of the structured substrate 125' looks smoothly wavelike) transversely arranged in rows. The crests (or peaks) of the prism structures in adjacent rows are substantially parallel to each other and the pitches P1 between the adjacent crests are constant. The structured substrate 125 may be formed using an optically transparent material such as an ultraviolet (UV) polymerizable resin or a UV elastic resin material. The support base plate 126 is adjacent to the light emitting surface 125b of the structured substrate 125 and has a light incidence surface 126a on one side and a light emitting surface 126b on another side opposite to the light incidence surface 126a. The support base plate 126 may be made of a transparent material, such as polyethylene-terephthalate (PET), acryl, polycarbonate (PC), polyethylene naphthalate (PEN), other polymers known by a person ordinarily skilled in the art, and a compound of foregoing polymers or a copolymer of them. At least one of the light incidence surface 126a, the light emitting surface 126b and the middle of the support base plate 126 includes a plurality of buried particles 127 which may be organic particles or inorganic particles. The buried particles 127 may be formed using polymethyl methacrylate (PMMA), silica, silicone, polystyrene (PS), melamine, $BaSO_4$, $CaCO_3$, $TiO_2$, $ZrO_2$, $AlO_3$, silica gel, and a combination mixture of the foregoing materials. The shape of the particles may be spherical, ellipsoidal, grape-string-like, hollow or polyhedral. The buried particles 127 can scatter light and redistribute some passed light so that the light emitted from the composite optical film 124 can be directed forward along the normal line of the light emitting surface 126b. The bead loading of the buried particles 127 and the number of the buried particles 127 protruded on the light emitting surface 126b affect the roughness, scratch-resistance and transmittance of the film. The requirement for the haze (3-85%) of the composite optical film 124 can be met by varying the bead loading (about 2-50%) of the buried particles 127 protruded on the light emitting surface 126b. The height of the protruded portion of the particle is about one fifth to two fifths of its diameter. FIGS. 3a and 3b illustrate the light emitting surface 126b including a plurality of buried particles 127 in accordance with two embodiments of the application. FIG. 6 is an SEM photograph of a light emitting surface 126b with a plurality of buried particles 127.

Figure 3D:
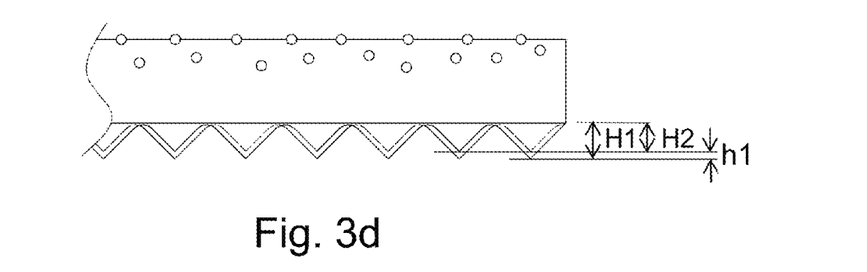
FIG. 3d is a schematic cross-sectional view of the composite optical film taken along a B-B line in FIG. 3c.
Figure 3E:
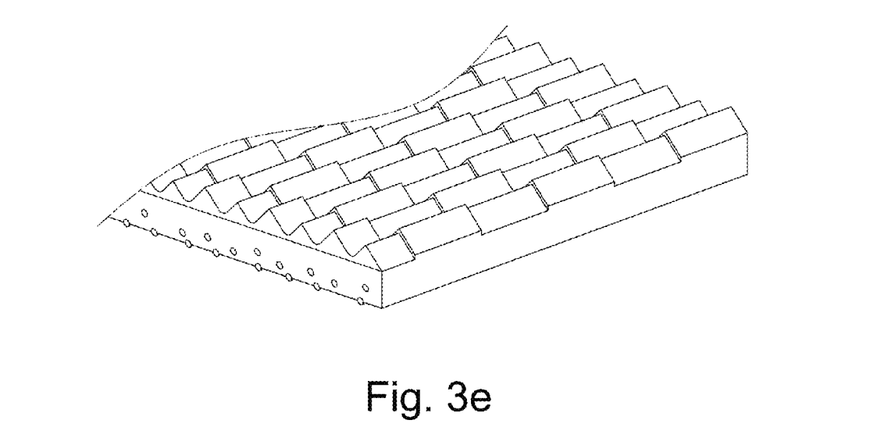
FIG. 3e is a schematic perspective view of the flipped composite optical film with an angle of 180° in FIG. 3c.
Figure 4A:
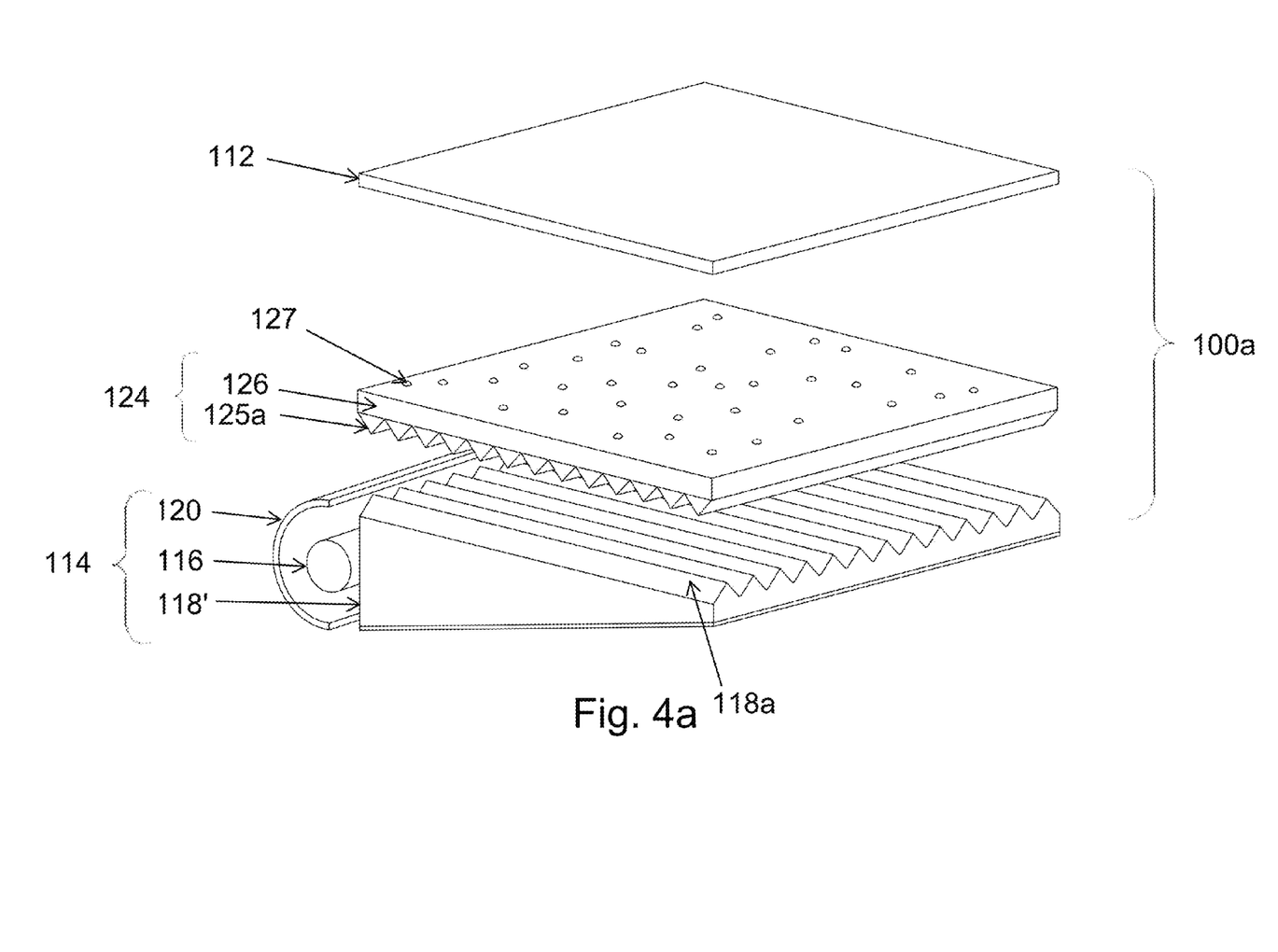
FIG. 4a schematically illustrates a flat panel display, in accordance with one embodiment of the present invention.
Figure 4B:
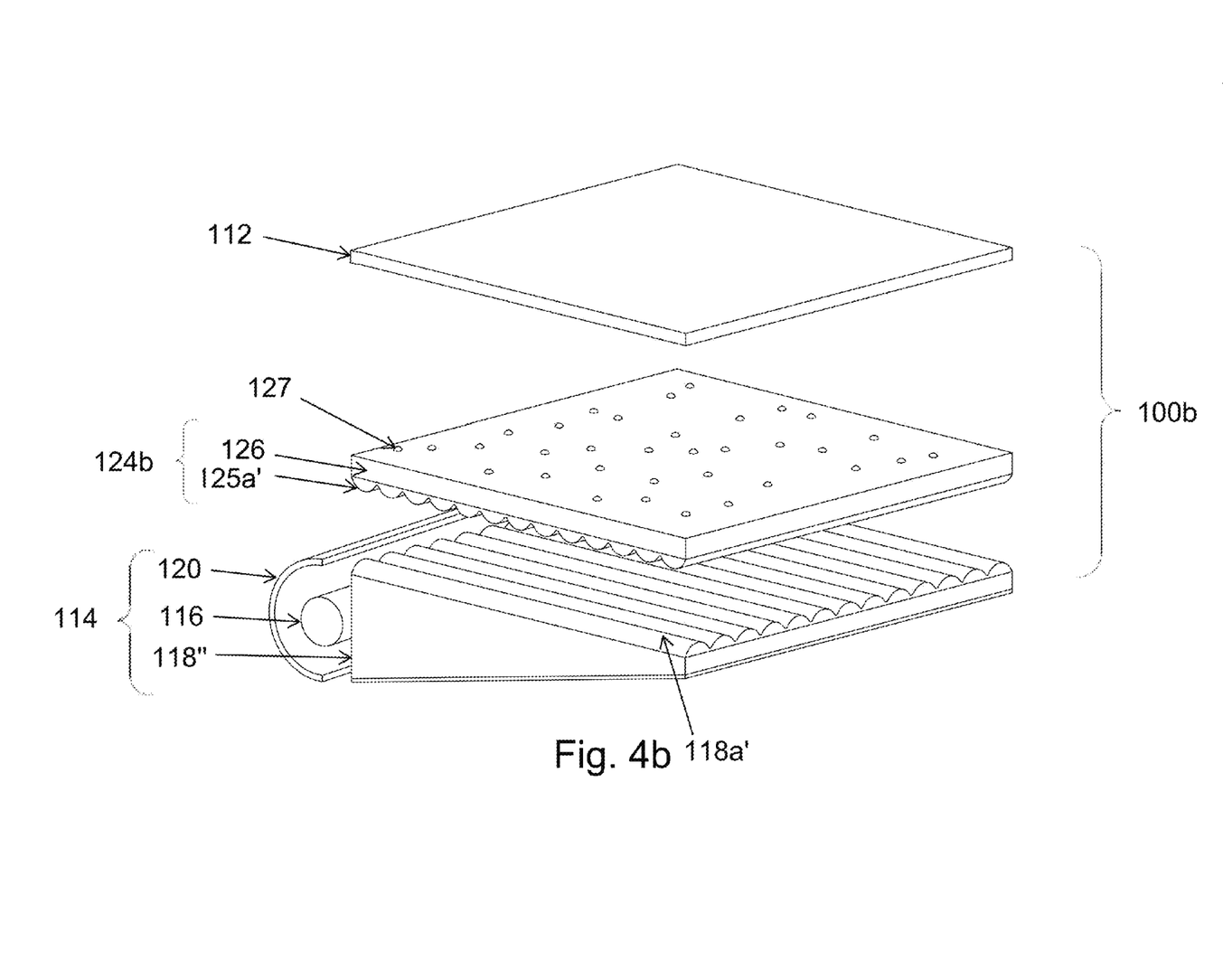
FIG. 4b schematically illustrates a flat panel display, in accordance with another embodiment of the present invention.

In these embodiments, the heights of the crests of the longitudinal prism structures of the composite optical film 124 or the heights of the crests of the longitudinal lens structures of the composite optical film 124b are constant (as shown in FIGS. 3a and 3b). The heights of the crests of the lens structures differ or vary by h1 along their longitudinal directions, as shown in FIG. 3c. FIG. 3d is a schematic cross-sectional view of the composite optical film taken along a B-B line in FIG. 3c. The higher crest of the prism structures along their longitudinal directions is H1 in height, and the lower crest of them is H2 in height. The difference between H1 and H2 is h1 (i.e. H1−H2=h1). FIG. 3e is a schematic perspective view of the flipped composite optical film with an angle of 180° in FIG. 3c. This figure shows that the crests of the lens structures differ or vary in height along their longitudinal directions. In another embodiment, FIGS. 4a and 4b illustrate flat panel displays 100a and 100b. As shown in FIG. 4a, the light guide plate 118' comprises a structured light emitting surface 118a which includes a plurality of longitudinal prism structures transversely arranged in rows. Further, as shown in FIG. 4b, the light guide plate 118" comprises a structured light emitting surface 118a' which includes a plurality of longitudinal lens structures transversely arranged in rows. The structured light emitting surfaces 118a and 118a' are respectively used to scatter light and enhance brightness. The light is directed outwards from the light guide plates 118' and 118". The structured light incidence surfaces 125a and 125a' of the composite optical films 124 and 124b respectively receive the light emitted from the structured light emitting surfaces 118a and 118a'.

Figure 5A:
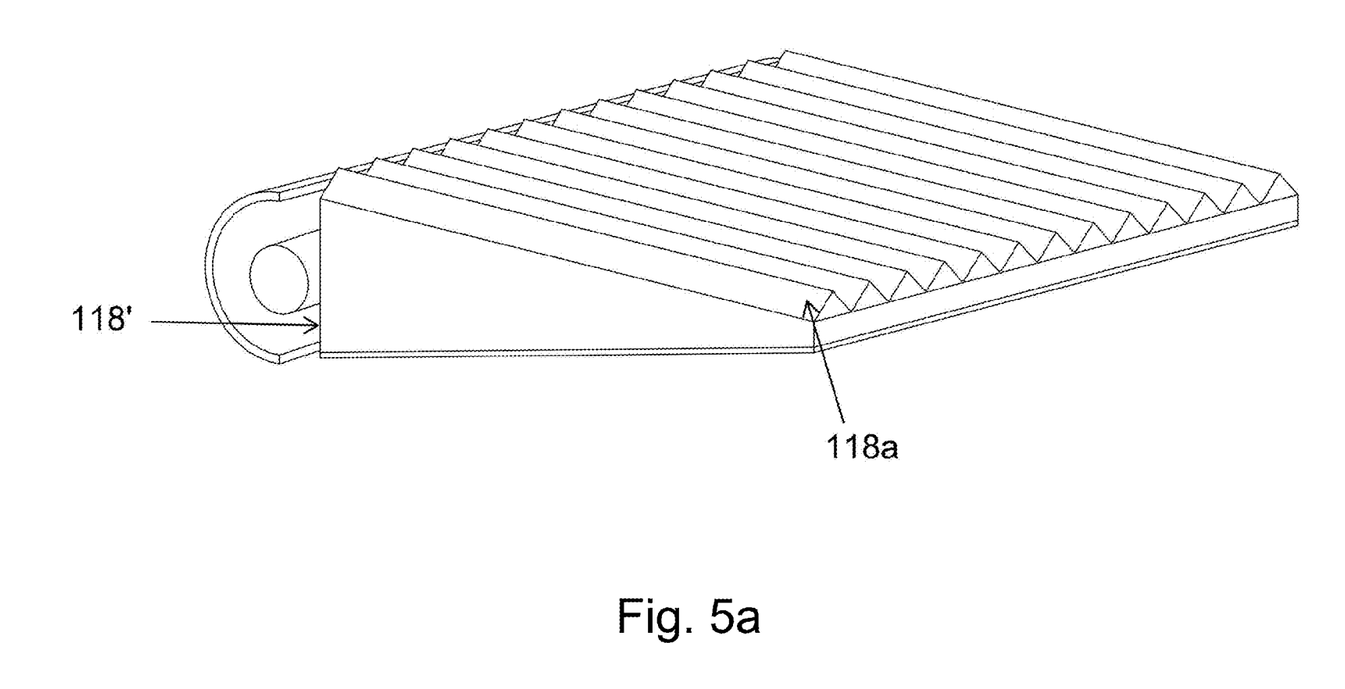
FIG. 5a is a schematic perspective view of a light guide plate having longitudinal prism structures with varied height transversely arranged in rows, in accordance with one embodiment of the present invention.
Figure 5B:
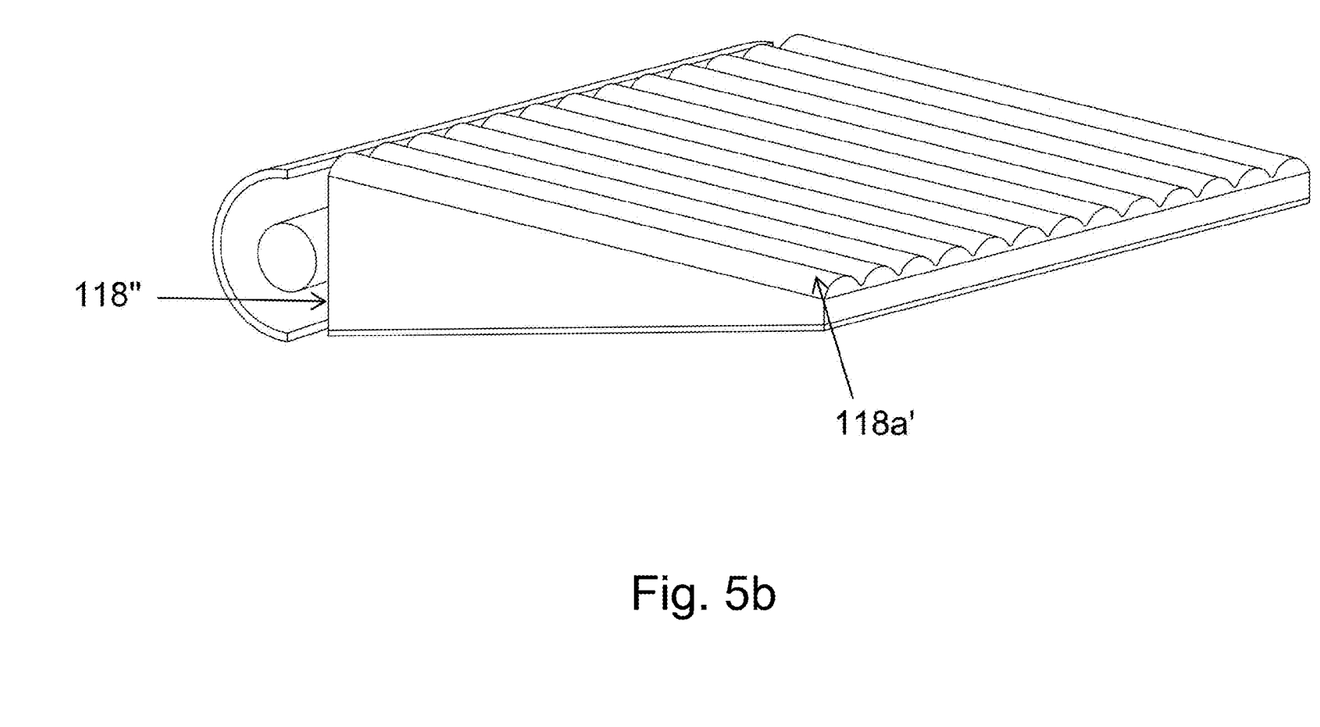
FIG. 5b is a schematic perspective view of a light guide plate having longitudinal lens structures transversely arranged in rows, in accordance with one embodiment of the present invention.
Figure 5C:
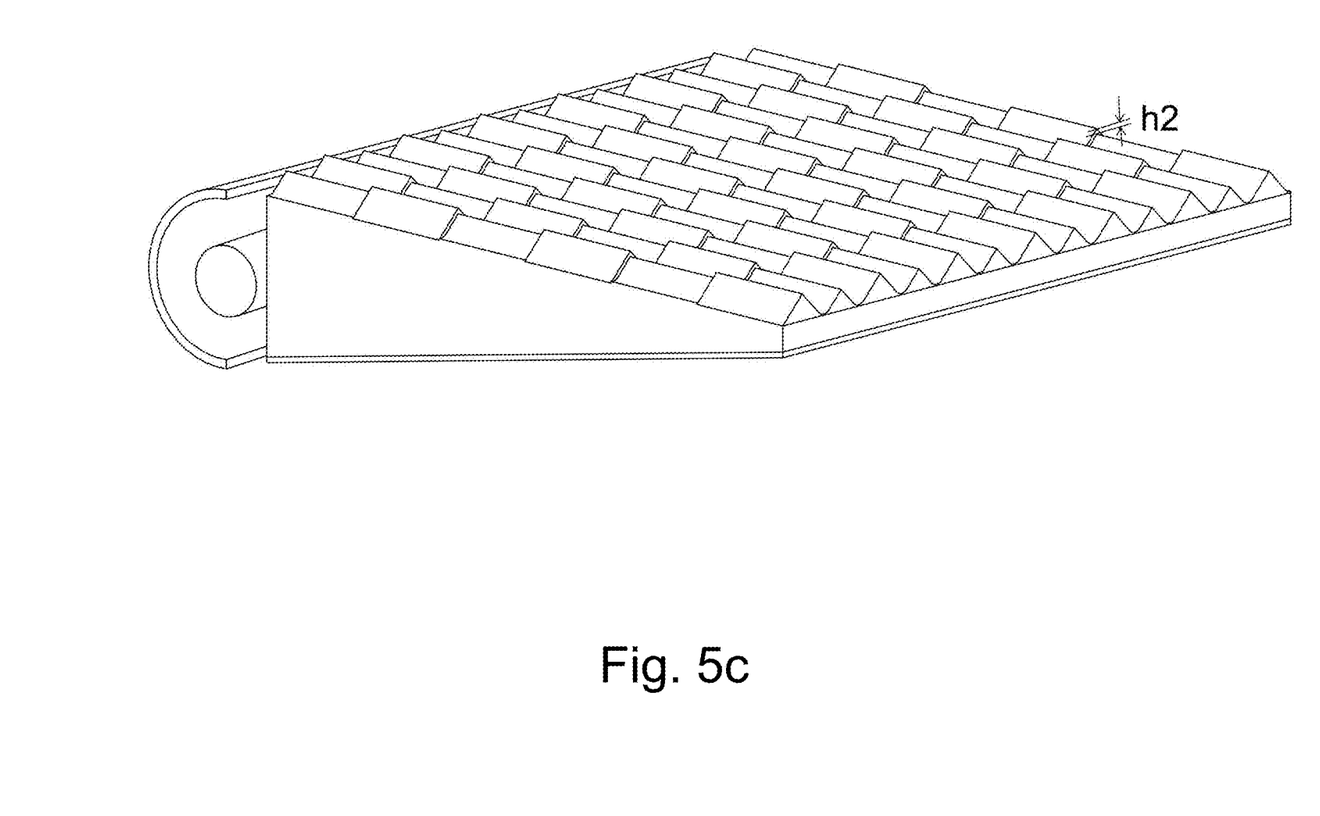
FIG. 5c is a schematic perspective view of a light guide plate having longitudinal prism structures with varied height transversely arranged in rows, in accordance with one embodiment of the present invention.
Figure 5D:
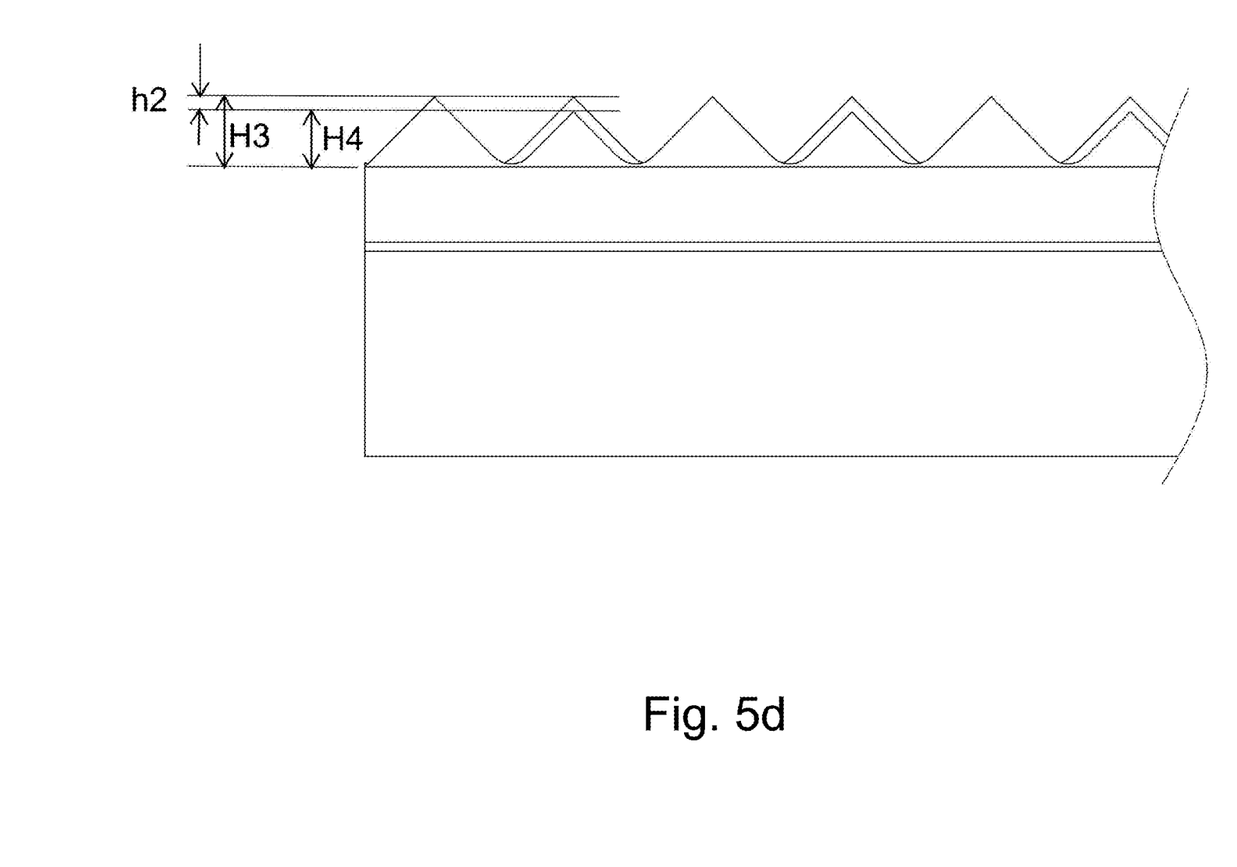
FIG. 5d is a schematic cross-sectional view of the light guide plate taken along a C-C line in FIG. 5c.

In the foregoing embodiments, as shown in FIG. 5a, the light guide plate 118' comprises a structured light emitting surface 118a which includes longitudinal prism structures transversely arranged in rows. Furthermore, as shown in FIG. 5b, the light guide plate 118" comprises a structured light emitting surface 118a' which includes a plurality of longitudinal lens structures transversely arranged in rows. The crests of the prism structures or the lens structures in adjacent rows are substantially parallel to each other and the pitches p2 between the adjacent crests are constant. As shown in FIGS. 5a and 5b, the heights of the crests of the longitudinal prism structures or the heights of the crests of the longitudinal lens structures are constant. The heights of the crests of the lens structures vary by h2 along their longitudinal directions, as shown in FIG. 5c. FIG. 5d is a schematic cross-sectional view of the light guide plate taken along a C-C line in FIG. 5c. The higher crest of the prism structures along their longitudinal directions is H3 in height, and the lower crest of them is H4 in height. The difference between H3 and H4 is h2 (i.e. H3−H4=h2).

In another embodiment, the longitudinal prism structures or lens structures transversely arranged in rows of the composite optical film 124 and the longitudinal lens structures transversely arranged in rows of the light guide plate 118 are arranged by aligning them at a relative angle of 90° so that the entire brightness is optimal. Furthermore, in order to eliminate the interference fringes or moire patterns occurring in the pixel array of the optical films, the plates and the liquid crystal module, in another embodiment, the relative angle between two aligned optical pieces can be below 90° by adjusting them, but the entire brightness is accordingly reduced. The aligned angle between the composite optical film having longitudinal lens structures and the light guide plate having longitudinal lens structures affects the entire brightness in a manner listed in Table 1-1. In another embodiment, the brightness of the composite optical film is changeable by adjusting its haze. The brightness of the composite optical film is reduced as its haze is increased. However, referring to Table 1-2, as the haze is increased, the composite optical film can have better effects on defect masking and optical uniformity for the module, but the assembly of the composite optical film and the plane light guide plate cannot resist wet-out. In another embodiment, Table 1-3 shows the relation between the haze and the entire brightness of the composite optical film whose heights of the crests of the prism structures vary along a transversal direction. The combination of such a composite optical film and a flat light guide plate can resist wet-out.

TABLE 1-1 the relation of the aligned angle and the entire brightness between the composite optical film and the light guide plate

| aligned angle (degree) | prism pitch (um) | prism angle (degree) | haze (%) | gain of brightness |
|---|---|---|---|---|
| 90 | 24 | 68 | 5 | 9.01 |
| 86 | 24 | 68 | 5 | 8.97 |
| 82 | 24 | 68 | 5 | 8.53 |
| 78 | 24 | 68 | 5 | 8.26 |
| 74 | 24 | 68 | 5 | 7.86 |
| 70 | 24 | 68 | 5 | 6.75 |

TABLE 1-2 the relation of the haze and the entire brightness between the composite optical film

| haze (%) | prism pitch (um) | prism angle (degree) | thickness (um) | adhesion | aligned angle (degree) | gain of brightness | hardness | defect masking | optical uniformity | wet-out |
|---|---|---|---|---|---|---|---|---|---|---|
| 5  | 24 | 68 | 156 ± 5 | 5B | 90 | 9.01 | 2H | 3 | 3 | No |
| 12 | 24 | 68 | 158 ± 5 | 5B | 90 | 8.72 | 2H | 3 | 3 | No |
| 30 | 24 | 68 | 155 ± 5 | 5B | 90 | 7.33 | 3H | 5 | 5 | No |
| 45 | 24 | 68 | 159 ± 5 | 5B | 90 | 6.02 | 3H | 5 | 5 | No |

TABLE 1-3 the relation of the haze and the entire brightness between the composite optical film resisting wet-out

| haze (%) | prism pitch (um) | prism angle | thickness (um) | adhesion | aligned angle | gain of brightness | hardness | defect masking | optical uniformity | wet-out |
|---|---|---|---|---|---|---|---|---|---|---|
| 5  | 24 | 68 | 154 ± 5 | 5B | 90 | 8.90 | 2H | 3 | 3 | Yes |
| 12 | 24 | 68 | 156 ± 5 | 5B | 90 | 8.25 | 2H | 3 | 3 | Yes |
| 30 | 24 | 68 | 157 ± 5 | 5B | 90 | 7.13 | 3H | 5 | 5 | Yes |

In other embodiments, the haze of the composite optical film 124 can be controlled to 3-85% according to the thickness of the support base plate 126, the prism structure or the angle, height, and pitch of the crest of the lens structure, the amount of buried particles, and the amount of protruded particles.

In other embodiments, the thickness of the support base plate 126 may be 25 µm, 38 µm, 50 µm, 75 µm, 100 µm, 125 µm, 188 µm, 250 µm, or 300 µm. The thickness of the support base plate formed using an UV (ultraviolet) curable adhesive may be 10-100 µm, preferably 12-40 µm.

Table 2 shows the characteristics of support base plates with various thicknesses and prism structures with various thicknesses such as brightness gain, high scratch-resistance and so on. The adhesion listed in the table is measured under the test standard of ASTM D3359-95a which is used to determine the adhesion between the prism structure layer and the support base plate. The prism structures are divided into 100 small areas using a cross cutter along longitudinal and transverse directions, and then a 3M tape with model No. #600 is attached to them and pulled up. A magnifying glass is used to inspect the adhesion condition of the laterals of the 100 areas. The determination standard is shown in Table 3.

TABLE 3 the standard of ASTM D3359-95a for determining adhesion

| classification | % of area removed | Surface of cross-cut from which flaking has occurred for 6 parallel cuts and adhesion range by % |
|---|---|---|
| 5B | 0% none | |
| 4B | below 5% | |
| 3B | 5-15% | |
| 2B | 15-35% | |

TABLE 2 the characteristics of support base plates with various thicknesses and prism structures with various thicknesses such as brightness gain, high scratch-resistance and so on

| thickness of support base plate (um) | haze (%) | prism pitch | prism angle (degree) | Thickness of composite film (um) | adhesion | aligned angle (degree) | gain of brightness | hardness | defect masking | optical uniformity |
|---|---|---|---|---|---|---|---|---|---|---|
| 125 | 30 | 50 | 68 | 167 ± 5  | 5B | 90 | 7.74 | 3H | 5 | 5 |
| 188 | 30 | 50 | 68 | 229 ± 8  | 5B | 90 | 7.56 | 3H | 5 | 5 |
| 250 | 30 | 50 | 68 | 292 ± 10 | 5B | 90 | 7.24 | 3H | 5 | 5 |

TABLE 3-continued the standard of ASTM D3359-95a for determining adhesion

| classification | % of area removed | Surface of cross-cut from which flaking has occurred for 6 parallel cuts and adhesion range by % |
|---|---|---|
| 1B | 35-65% | |
| 0B | above 65% | |

In other embodiments, the structured substrate 125 has longitudinal prism structures arranged in rows. The pitch between the prisms may be 20-100 μm, preferably 20-60 μm, more preferably 20-40 μm, most preferably 20-30 μm. The angle of the prism may be acute and range from 40-120 degrees, preferably 50-100 degrees, more preferably 60-90 degrees, most preferably 60-75 degrees. The angle of the prism may be rounded off with a radius of 0.1-5 μm, preferably 0.3-1 μm.

In other embodiments, the structured substrate 125 has longitudinal lens structures arranged in rows. The pitch between the lenses may be 20-100 μm, preferably 20-70 μm, more preferably 20-50 μm.

The composite optical film of the present invention may be applicable to an apparatus with an LCD such as a television, a notebook computer, a monitor, a hand-held electronic apparatus (e.g. a mobile phone), a camera, a personal digital assistance (PDA) and the like for providing brighter images.

An electronic apparatus (e.g. PAD, mobile phone, television, monitor, notebook computer, refrigerator, etc.) comprises a flat panel display including a composite optical film of the present invention. The flat panel display comprises: a display module showing an image according to image data; and a backlight module projecting light onto the display module. In the embodiment, a composite optical film is disposed between the display module and the backlight module, a diffusion sheet is disposed between the display module and the composite optical film, and a control circuit directs the image data to the display module for generating an image according to the image data.

The foregoing embodiments of the invention have been presented for the purpose of illustration. Although the invention has been described by certain preceding examples, it is not to be construed as being limited by them. They are not intended to be exhaustive, or to limit the scope of the invention. Modifications, improvements and variations within the scope of the invention are possible in light of this disclosure.

What is claimed is:

1. A composite optical film, comprising:
a structured substrate including a structured light incidence surface and a light emitting surface opposite to the structured light incidence surface, wherein the structured light incidence surface includes longitudinal prism structures or longitudinal lens structures arranged in rows; and
a support base plate adjacent to the light emitting surface of the structured substrate, the support base plate having a light incidence surface on one side and a light emitting surface on another side opposite to the light incidence surface,
wherein at least one of the light incidence surface and the light emitting surface of the support base has a plurality of buried particles;
wherein at least one portion of the buried particles are protruded on the light emitting surface of the support base plate;
wherein the longitudinal prism structures or the longitudinal lens structures in the rows are transversely arranged, wherein crests of the prism structures or the lens structures in adjacent rows are substantially parallel to each other and distances between the adjacent crests are constant;
wherein heights of the crests of the longitudinal prism structures or the longitudinal lens structures in the rows vary along a longitudinal direction.

2. An optical film having a structured light input surface and a light output surface opposite to the structured light input surface, comprising:
a substrate having a first surface and a second surface opposite to the first surface, wherein the first surface of the substrate defines the light output surface of the optical film; and
a structured layer having a third surface and a fourth surface opposite to the third surface, wherein the third surface of the structured layer is on the second surface of the substrate and the fourth surface of the structured layer defines the structured light input surface of the optical film;
wherein the fourth surface of the structured layer comprises a plurality of prisms, wherein each of the plurality of prisms extends substantially along a first direction, wherein each of the plurality of prisms has a height relative to the second surface of the substrate, wherein the height of each of at least one of the plurality of prisms varies along the first direction.

3. The optical film according to claim 2, wherein each of the plurality of prisms has a constant vertex angle throughout the entire prism.

4. An optical assembly, comprising:
an optical film according to claim 3; and
a light guide disposed over the structured light input surface of the optical film.

5. The optical assembly according to claim 4, wherein the light guide has a structured surface facing the structured light input surface of the optical film, wherein the structured surface of the light guide comprises a plurality of microstructures, wherein each of the plurality of microstructures extends substantially along a second direction.

6. The optical film according to claim 2, wherein each of the plurality of prisms extends continuously along the first direction.

7. The optical film according to claim 6, wherein each of the plurality of prisms has a constant vertex angle throughout the entire prism.

8. An optical assembly, comprising:
an optical film according to claim 7; and
a light guide disposed over the structured light input surface of the optical film.

9. The optical assembly according to claim 8, wherein the light guide has a structured surface facing the structured light input surface of the optical film, wherein the structured surface of the light guide comprises a plurality of microstructures, wherein each of the plurality of microstructures extends substantially along a second direction.

10. The optical film according to claim 2, wherein each of the plurality of prisms extends continuously from a first edge of the optical film to a second edge of the optical film opposite to the first edge of the optical film.

11. The optical film according to claim 10, wherein each of the plurality of prisms has a constant vertex angle throughout the entire prism.

12. An optical assembly, comprising:
an optical film according to claim 11; and
a light guide disposed over the structured light input surface of the optical film.

13. The optical assembly according to claim 12, wherein the light guide has a structured surface facing the structured light input surface of the optical film, wherein the structured surface of the light guide comprises a plurality of microstructures, wherein each of the plurality of microstructures extends substantially along a second direction.

14. An optical film having a structured light input surface and a light output surface opposite to the structured light input surface, comprising:
a substrate having a first surface and a second surface opposite to the first surface, wherein the first surface of the substrate defines the light output surface of the optical film; and
a structured layer having a third surface and a fourth surface opposite to the third surface, wherein the third surface of the structured layer is on the second surface of the substrate and the fourth surface of the structured layer defines the structured light input surface of the optical film;
wherein the fourth surface of the structured layer comprises a plurality of prisms, wherein each of the plurality of prisms extends continuously along a first direction and has a pair of faces intersecting to form a ridge, wherein the plurality of prisms are disposed along a second direction substantially perpendicular to the first direction, wherein the ridge of each of the plurality of prisms has a height relative to the second surface of the substrate, wherein the height of each of the plurality of prisms varies along the first direction.

15. The optical film according to claim 14, wherein each of the plurality of prisms is a triangular prism.

16. The optical film according to claim 14, wherein each of the plurality of prisms has a constant vertex angle throughout the entire prism.

17. The optical film according to claim 14, wherein each of the plurality of prisms extends continuously and linearly along the first direction.

18. The optical film according to claim 14, wherein each of the plurality of prism extends continuously from a first edge of the optical film to a second edge of the optical film opposite to the first edge of the optical film.

19. An optical assembly, comprising:
an optical film according to claim 14; and
a light guide disposed over the structured light input surface of the optical film.

20. The optical assembly according to claim 19, wherein the light guide has a structured surface facing the structured light input surface of the optical film, wherein the structured surface of the light guide comprises a plurality of microstructures, wherein each of the plurality of microstructures extends substantially along the second direction.

* * * * *